United States Patent [19]

Davidson

[11] Patent Number: 5,631,557

[45] Date of Patent: May 20, 1997

[54] MAGNETIC SENSOR WITH ENCAPSULATED MAGNETICALLY SENSITIVE COMPONENT AND MAGNET

[75] Inventor: Robert M. Davidson, Freeport, Ill.

[73] Assignee: Honeywell Inc., Minneapolis, Minn.

[21] Appl. No.: 602,187

[22] Filed: Feb. 16, 1996

[51] Int. Cl.⁶ ............................................. G01P 3/48
[52] U.S. Cl. ................................................ 324/174
[58] Field of Search ........................ 324/207.2–207.26, 324/174, 251, 252; 204/32.1; 338/32 R, 32 H

[56] References Cited

U.S. PATENT DOCUMENTS

| | | | |
|---|---|---|---|
| 4,917,778 | 4/1990 | Takada et al. | 204/32.1 |
| 5,121,289 | 6/1992 | Gagliardi . | |
| 5,250,925 | 10/1993 | Shinkle | 324/207.21 X |
| 5,414,355 | 5/1995 | Davidson et al. . | |
| 5,444,370 | 8/1995 | Wu . | |
| 5,488,294 | 1/1996 | Liddell et al. | 324/207.21 |
| 5,500,589 | 3/1996 | Sumcad | 324/202 |
| 5,508,611 | 4/1996 | Schroeder et al. | 324/252 |

*Primary Examiner*—Sandra L. O'Shea
*Assistant Examiner*—Roger C. Phillips
*Attorney, Agent, or Firm*—William D. Lanyi

[57] ABSTRACT

A magnetic sensor is provided in which a flexible substrate is used to support a magnetically sensitive component and other electronic components relative to the position of a permanent magnet. A thermoset material is used as an encapsulant to form a solid magnetic sensor in which the magnetically sensitive component, the permanent magnet and a portion of the flexible substrate are encapsulated within the thermoset material after it solidifies. A portion of the flexible substrate extends from an end of the solidified encapsulant to permit electrical connection to other components and devices.

5 Claims, 5 Drawing Sheets

MAGNETIC SENSOR WITH ENCAPSULATED MAGNETICALLY SENSITIVE COMPONENT AND MAGNET

BACKGROUND OF THE INVENTION

1. Field of the Invention

The present invention relates generally to a magnetic sensor and, more particularly, to a magnetic sensor that has a magnet and magnetically sensitive component encapsulated within a solidified quantity of thermoset material without the need for a carrier to hold the magnet and the magnetically sensitive component in place relative to each other.

2. Description of the Prior Art

Many different types of magnetic sensors are known to those skilled in the art. One type of magnetic sensor incorporates a magnetically sensitive component, such as a Hall effect element or a magnetoresistive element, in combination with a permanent magnet that provides a biasing magnetic field. The magnetically sensitive component and the permanent magnet are arranged relative to each other so that the magnetically sensitive component is disposed within the magnetic field of the permanent magnet. The sensor detects the movement of a ferromagnetic object, such as a geartooth, by sensing the change in the magnetic field caused by the movement of the ferromagnetic target within the sensor's detection zone. In known sensors, a carrier of some type is used to contain the magnet and hold the magnet in place relative to the position of the magnetically sensitive component. In certain types of magnetic sensors, it is extremely important to hold the magnetically sensitive component at a precise location relative to the permanent magnet following a calibration procedure.

U.S. Pat. No. 5,121,289, which issued to Gagliardi on Jun. 9, 1992, discloses an encapsulatable sensor assembly which includes an external housing with internal support components for retaining an active sensor element and associated electrical circuitry in a predetermined relationship while providing a plurality of internal sequentially interconnected cavities for facilitating a flow of an encapsulating material from an encapsulating material injection port to a vented overflow to assure a complete fill of the internal cavities to restrain the internal components. The sensor assembly provides a structure for a void free encapsulation and internal lead wire stress relief concurrently with location control of the internal components while also providing a combination which is easily adaptable to automatic assembly and encapsulation techniques.

U.S. Pat. No. 5,414,355, which issued to Davidson et al on May 9, 1995, discloses a magnet carrier disposed within an outer housing. The carrier is shaped to retain a permanent magnet in a particular position relative to a plurality of electrical conductors and a substrate on which a magnetically sensitive component is attached. The carrier and its associated components are inserted into a housing which can be deformed to permanently retain the carrier within a cavity of the housing. All of the components of the sensor are designed to be easily assembled along a common axis to facilitate automatic assembly and manufacture of the sensor. The magnetically sensitive component can be a Hall effect element that is associated with other electrical components which are also attached to a substrate that is disposed proximate a front end of the carrier.

U.S. Pat. No. 5,444,370, which issued to Wu on Aug. 22, 1995, describes a magnetic angular position sensor with two magnetically sensitive components arranged proximate two target tracks having complementary magnetic and nonmagnetic segments. The sensor is provided with two target tracks that are arranged in generally parallel association with each other. Each of the target tracks comprises magnetic and nonmagnetic segments which are arranged in alternating patterns. Each magnetic segment of the first target track is disposed along side a nonmagnetic segment of the second track and each magnetic segment of the second target track is disposed along side a nonmagnetic segment of the first target track. First and second magnetically sensitive components are disposed proximate the first and second target tracks, respectively, and a source of a magnetic field is disposed proximate the first and second magnetically sensitive components. Distortions of the magnetic field imposed perpendicularly on the first and second magnetically sensitive components are used to provide first and second output signals therefrom. A third output signal, which is a function of the first and second output signals, is used to determine the location of the first and second target tracks with respect to the first and second magnetically sensitive components. The magnetic and nonmagnetic segments of the first and second target tracks can be different sizes and arranged in a pattern which permits the specific and absolute location of a movable object to be determined.

Sensors which comprise a hollow housing into which components are inserted and eventually encapsulated within solidified epoxy present a potentially serious manufacturing problem. The curing of the liquid epoxy requires a significant time period and often requires the use of heat to cure the encapsulating material. During the curing process, the sensor must be held in an appropriate position for an extended period of time.

Certain sensors have been developed which are encapsulated by an overmolding process, but significant care must be taken to avoid dislodging electronic components during the process if a thermoplastic material is used as the encapsulant. Because of the significant forces typically imposed on the encapsulated component during the overmolding process, the components must be rigidly attached to a printed circuit board or other type of rigid substrate prior to the overmolding procedure. For these and other reasons, known magnetic sensors provide a carrier which is typically made of plastic and shaped to receive the permanent magnet within it. The carrier is then typically used to position the magnetic relative to a magnetically sensitive component and hold the magnetically sensitive component in position relative to the permanent magnet during subsequent assembly and manufacturing processes.

The use of a plastic carrier for the purposes described above adds to the costs of the magnetic sensor and also increases its required size. It would therefore be significantly beneficial if a magnetic sensor could be made without the need for a plastic carrier to hold the permanent magnet. It would also be beneficial if a magnetic sensor could be manufactured by directly overmolding a permanent magnet and a magnetically sensitive component together with a thermoset encapsulant. It would also be beneficial if the electronic components of the magnetic sensor could be held in their respective positions on a flexible substrate to facilitate the accurate positioning of the magnetically sensitive component at one end of the permanent magnet while disposing the other electronic components along the side of the permanent magnet. When the magnetically sensitive component comprises a magnetoresistive element which therefore most must be positioned accurately relative to the permanent magnet, it would also be significantly beneficial if a means is provided to rigidly attach the permanent magnet to the magnetically sensitive component prior to the encapsulation of the sensor so that the accurate position of these components can be maintained prior to and during the encapsulating process with a thermoset material.

SUMMARY OF THE INVENTION

A magnetic sensor made in accordance with the present invention comprises a flexible substrate having a plurality of electrically conductive runs attached thereto. In addition, a magnetically sensitive component is attached to the flexible substrate and connected in electrical communication with at least one of the plurality of electrically conductive runs. A permanent magnet is attached in a fixed position relative to the magnetically sensitive component and the magnetically sensitive component is disposed within the magnetic field of the permanent magnet proximate a magnetic pole of the permanent magnet. A quantity of solidified thermoset material is disposed around the permanent magnet, the magnetically sensitive component and a first portion of the plurality of electrically conductive runs. A second portion of the plurality of electrically conductive runs extends from the quantity of solidified thermoset material and permits the magnetic sensor to be connected in electrical communication with other devices. The permanent magnet and the magnetically sensitive component are encapsulated within the quantity of solidified thermoset material.

In one embodiment of the present invention, the flexible substrate is rigidly attached to the permanent magnet independently of the encapsulation provided by the quantity of solidified thermoset material. In other words, even though the quantity of solidified thermoset material will generally hold the permanent magnet in position relative to the both the flexible substrate and the magnetically sensitive component, certain embodiments of the present invention utilize solder to hold the magnet in position relative to the flexible substrate prior to and during the encapsulating process with a thermoset material. This attachment of the magnet to the flexible substrate with solder is typically used by the present invention when the magnetically sensitive component comprises a magnetoresistive element. If the magnetically sensitive component comprises a Hall effect element, the degree of accuracy maintained by this soldering attachment may not be necessary. The magnetically sensitive component of the present invention can be a magnetoresistive element or a Hall effect element. The permanent magnet of the present invention can comprise neodymium, boron and iron. It can also be plated with a nickel material. The use of a nickel plating material significantly facilitates the attachment of the magnet to the flexible substrate through the use of solder.

In most applications, a plurality of electronic components is attached in electrical communication with preselected ones of the plurality of electrically conductive runs.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Throughout the Description of the Preferred Embodiment, like components will be identified by like reference numerals.

Figure 1:
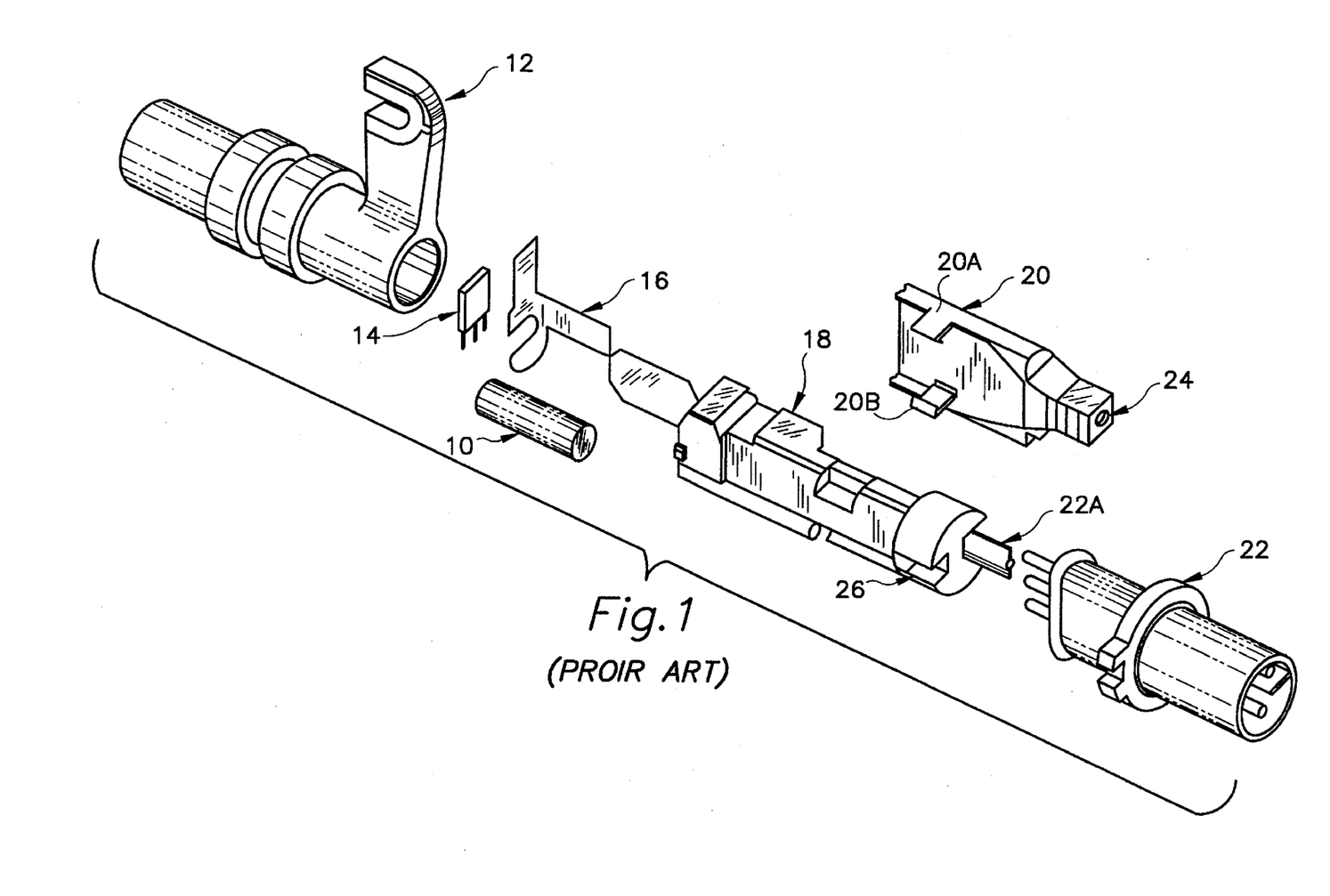
FIG. 1 shows an exploded view of a magnetic sensor known to those skilled in the art.

FIG. 1 shows an exploded view of the sensor described above in conjunction with U.S. Pat. No. 5,121,289. A permanent magnet 10 is located within the sensor housing 12 adjacent to an integrated circuit 14 which supports a Hall effect element. A flexible electrical circuit 16, or flexible substrate, contains a plurality of electrical conductors, or runs, and is used to provide electrical connections to the integrated circuit 14. An insert 18, or carrier, is arranged to provide a support and locating means for the permanent magnet 10. A cover 20 has projecting ears 20A and 20B and is arranged to be mounted on the insert 18. A lead wire connector 22 has electrical connection elements therein and is used to connect the sensor to associated equipment by a selective interconnection to electrical pins 22A which extend from the insert 18 and are electrically connected to the flexible circuit 16. A fill orifice 24, or port, is provided in the cover 20 in order to receive an injection of liquid encapsulation material and is connected through the cover 20 to sequentially interconnected cavities between the insert 18 and the housing 12 to permit the flow of an encapsulation material from the fill orifice 24 through the cover 18 an and into the cavities around the insert 18. A vent and overflow passage 26 is provided in the insert 18 to effect a venting of the gases within the sensor assembly during the encapsulation process and to enable any overflow of the encapsulation material to be expelled whereby the encapsulation material fully fills the internal passages and cavities. It should be understood that the encapsulation material injected into the cavities of the sensor requires time to cure and solidify before the sensor can be used.

Figure 2:
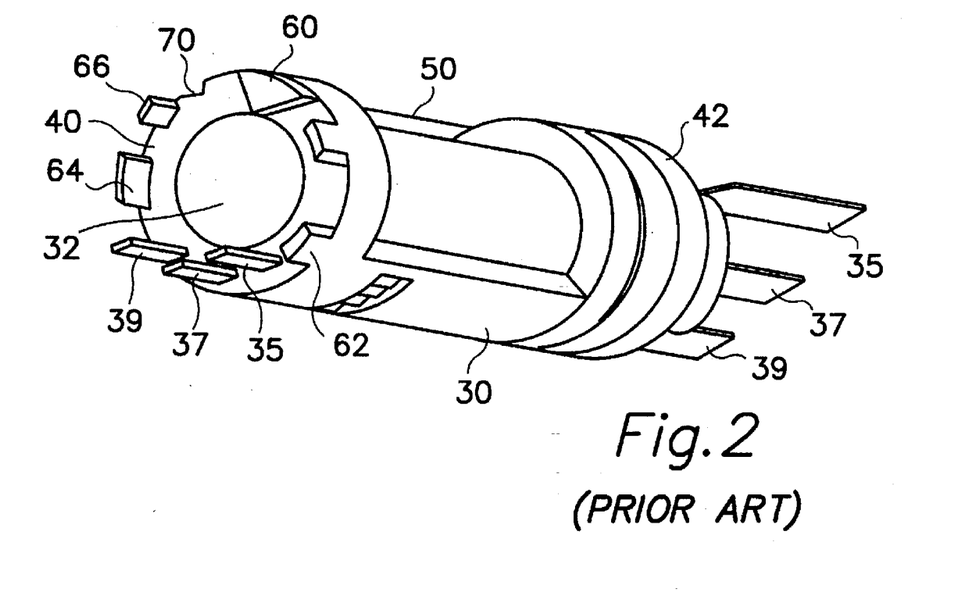
FIG. 2 shows a perspective view of a carrier used in a magnetic sensor known to those skilled in the art.

FIG. 2 shows a carrier that is known to those skilled in the art and disclosed in U.S. Pat. No. 5,414,355 which is discussed above. It should be understood that the carrier shown in FIG. 2 is not related to the method used to manufacture a magnetic sensor as described above and shown in FIG. 1. FIG. 2 shows a perspective view of a carrier 30 used to hold a magnet. The carrier 30 has a plurality of electrical conductors, 35, 37 and 39 molded within its body. The carrier has a front end 40 and a back end 42. An opening 32 is formed within the carrier 30 and is shaped to receive a magnet within it. The magnet, which is generally cylindrical and received within the opening 32, can be a centered permanent magnet or a molded permanent magnet. Molded magnets comprising neodymium, boron and iron are known to those skilled in the art and are commercially available.

With continued reference to FIG. 2, the carrier 30 comprises a rib 50 that is provided as part of the outer shape of the carrier 30 and used to prevent the front lip of an associated housing from catching on the carrier structure. Certain protrusions, such as those identified by reference numerals 60, 62, 64 and 66, correspond to the shape of an associated substrate (not shown in FIG. 2, but described in detail in U.S. Pat. No. 5,414,355) that contains electronic components. A notch 70 is provided to facilitate the passage of air when the carrier 30 is inserted into a cylindrical housing structure.

FIGS. 1 and 2 illustrate two known techniques for holding a permanent magnet in a position relative to a magnetically sensitive component during subsequent manufacturing processing. In FIG. 1, the permanent magnet 10 is held in a position relative to the integrated circuit 14 and its associated Hall effect element through the use of the insert 18 and its associated cover 20. The position between the magnet, the Hall effect element and the flexible substrate 16 is maintained, by the components shown in FIG. 1, until a liquid encapsulant can be injected into the structure and cured. Following the curing of the encapsulant material, the rigid internal structure of the solidified encapsulant maintains the accurate positions of the various components shown in FIG. 1. The carrier shown in FIG. 2 is used to hold the magnet in the opening 32 and then hold a circuit board, or substrate, at the front end 40 of the carrier 30. After the substrate is attached to the front end 40 of the carrier and the electrical leads, 35, 37 and 39, are soldered to the printed circuit board, the magnet in the opening 32 is held in a precise position relative to the magnetically sensitive component on the printed circuit board. Although the printed circuit board is not shown in FIG. 2, it is illustrated in U.S. Pat. No. 5,414,355. When the carrier 30 is inserted into a housing, or cylindrical can, the delicate components on the printed circuit board are protected from the intense forces that can occur during an injection molding operation using a thermoplastic encapsulant.

In magnetic sensors known to those skilled in the art, several problems can occur during their manufacture. As described above, injection molding produces forces that can damage electronic components when thermoplastic encapsulates are used. These encapsulates, which are injection as a molten liquid around components under significant pressure and elevated temperature, can easily dislodge delicate electronic components from printed circuit boards. If flexible circuits, or flexible substrates, are used in a magnetic sensor, the loss in rigidity as a result of the flexible substrate increases the difficulty in positioning the components in precise locations. More specifically, if flexible substrates are used in magnetic sensors that are encapsulated by injection molding with thermoplastic materials, the forces and temperature associated with the process can easily move and distort the flexible circuit during the injection of the encapsulant. In addition, the devices represented in FIGS. 1 and 2 also require additional plastic components, such as the carrier 30 in FIG. 2 and the insert 18 and cover 20 in FIG. 1.

U.S. Pat. Nos. 5,414,355 and 5,121,289 are both explicitly incorporated by reference in this specification.

The primary purpose of the present invention is to provide a magnetic sensor that is more easily and inexpensively manufactured. In addition, the purpose of the present invention is to provide a magnetic sensor that does not require the use of a plastic carrier or insert member to position the magnet relative to the magnetically sensitive component. Furthermore, a goal of the present invention is to provide a magnetic sensor that incorporates a flexible substrate to which a magnetically sensitive component can be attached. In addition, the flexible substrate can facilitate the accurate positioning of the magnetically sensitive component and other electronic components on the flexible substrate relative to a permanent magnet without requiring an additional plastic carrier or insert to accomplish this function.

Figure 3:
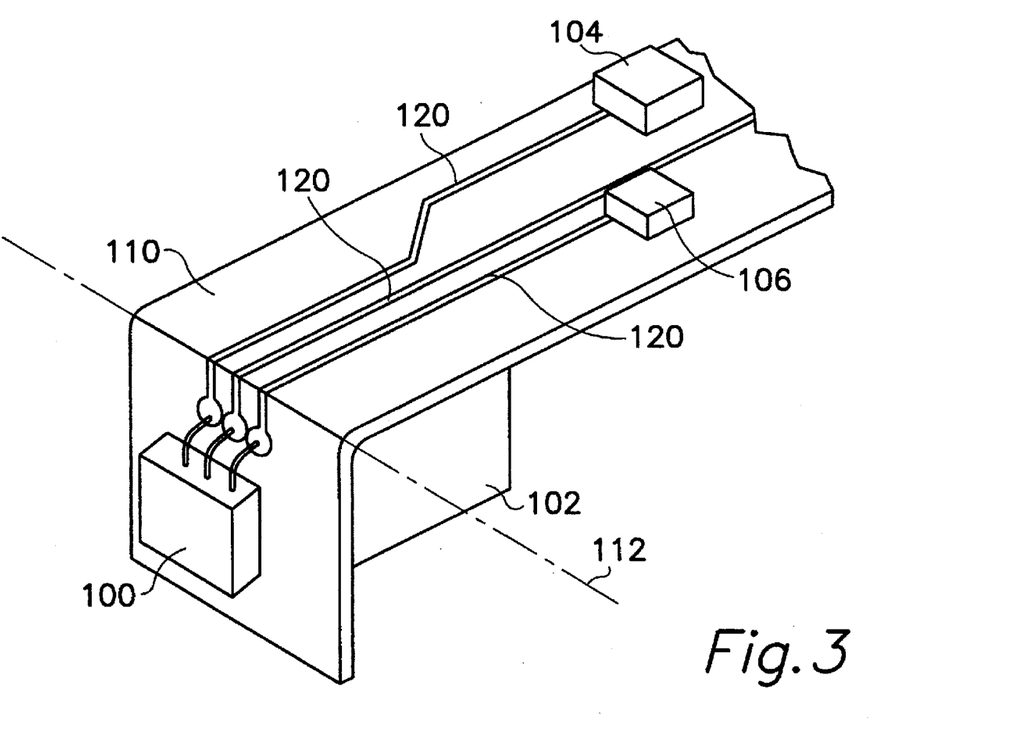
FIG. 3 is a highly schematic and simplified illustration of one of the functions of the present invention.

FIG. 3 is a highly schematic illustration that is used to show the intended purpose of the present invention. In order to properly position a magnetically sensitive component 100 relative to a permanent magnet 102 while also placing the associated electronic components, 104 and 106, at their proper positions, it is helpful to utilize a substrate that is flexible. The flexible substrate 110 can be bent along a bend line 112. By bending the flexible substrate 110 along line 112, the magnetically sensitive component 100 can be placed proximate a pole face of the permanent magnet 102 while the associated electronic components on the flexible substrate 110 can be placed at the side of the magnet to permit a convenient shape of the magnetic sensor to be achieved. A plurality of conductive runs 120 are attached to the flexible substrate 110 and these runs permit the components to be connected in electrical communication with other selected components. The use of conductive runs on printed circuit boards and on flexible substrates is well known to those skilled in the art and will be not be described in detail herein.

In certain applications, the position of the magnetically sensitive component 100 relative to the permanent magnet 102 is critical and must be accurately maintained during and following a calibration procedure. When the calibration procedure has determined the proper location of the magnetically sensitive component relative to the permanent magnet, that position must also be accurately maintained during the overmolding and encapsulation procedure. This is particularly true when the magnetically sensitive component 100 comprises a magnetoresistive element. It is not as critical when the magnetically sensitive component 100 comprises a Hall effect element. In order to maintain the position of the magnetically sensitive component relative to the permanent magnet, the present invention initially attaches the flexible substrate 110 to the permanent magnet 102 prior to the encapsulation process.

Figure 4:
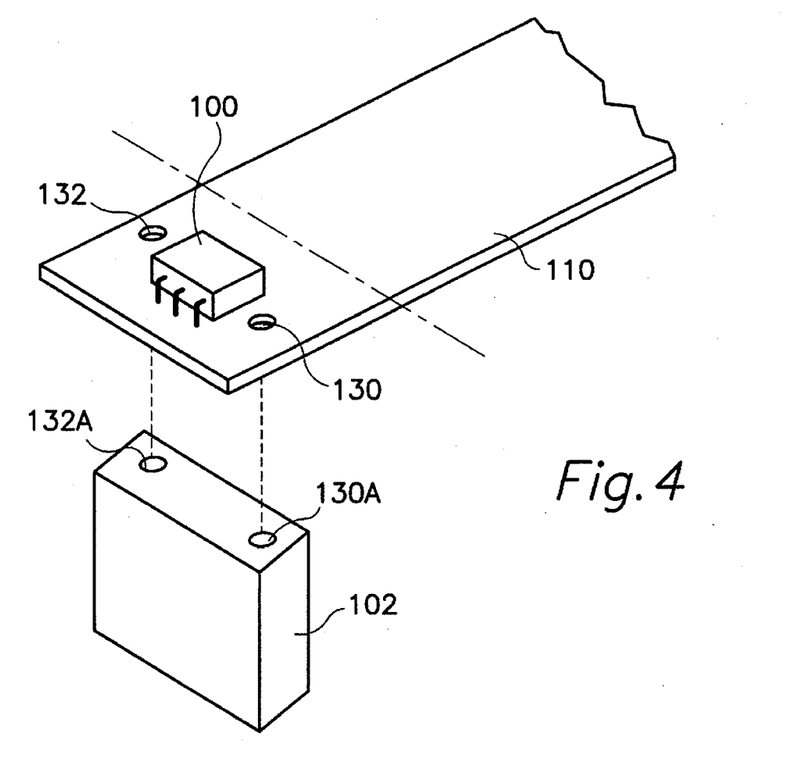
FIG. 4 is an exploded view showing a permanent magnet, a magnetically sensitive component and a flexible substrate prior to the attachment together of the elements.

FIG. 4 shows the flexible substrate 110 and the permanent magnet 102 in an exploded perspective view. The magnetically sensitive component 100 is shown attached to the flexible substrate 110 and is also shown with two holes, 130 and 132, through the flexible substrate 110. These holes allow solder to be melted and flow through the holes to the upper surface of the permanent magnet 102. If the permanent magnet 102 comprises a solderable material, such as a nickel plating, a firm bond can be achieved between the flexible substrate 110 and the plated magnet. In operation, a typical procedure would be to move the magnetically sensitive component 100 relative to the pole face until an acceptable location is achieved and then to melt the solder in order to attach the flexible substrate 110 to the permanent magnet 102. This dynamic calibration process would move the magnetically sensitive component while monitoring the output signal from it. When the output signal indicates that the magnetically sensitive component is in the proper position, the solder would be melted and the attachment of the flexible substrate to the magnet would be achieved. In one embodiment of the present invention, the flexible substrate 110 is that which is available in commercial quantities from the Sheldahl Corporation and identified as Novacald and Novaflex, which are registered trademarks of Sheldahl Incorporated. The flexible circuit used in the preferred embodiment of the present invention comprises a thin layer of copper on which a polyimide base laminate is attached. An additional layer of copper is attached to the other surface of the polyimide base laminate. The second layer of copper can be etched to define various soldering pads and conductive runs on an upper surface of the flexible substrate. A final polyimide cover layer can be attached to the exposed surface of the etched copper layer. All of the layers described above are attached to each other to form a flexible substrate. Many sizes and shapes of flexible substrates can be obtained commercially and the electrically conductive runs can be designed to suit individual applications and purposes.

Figure 5:
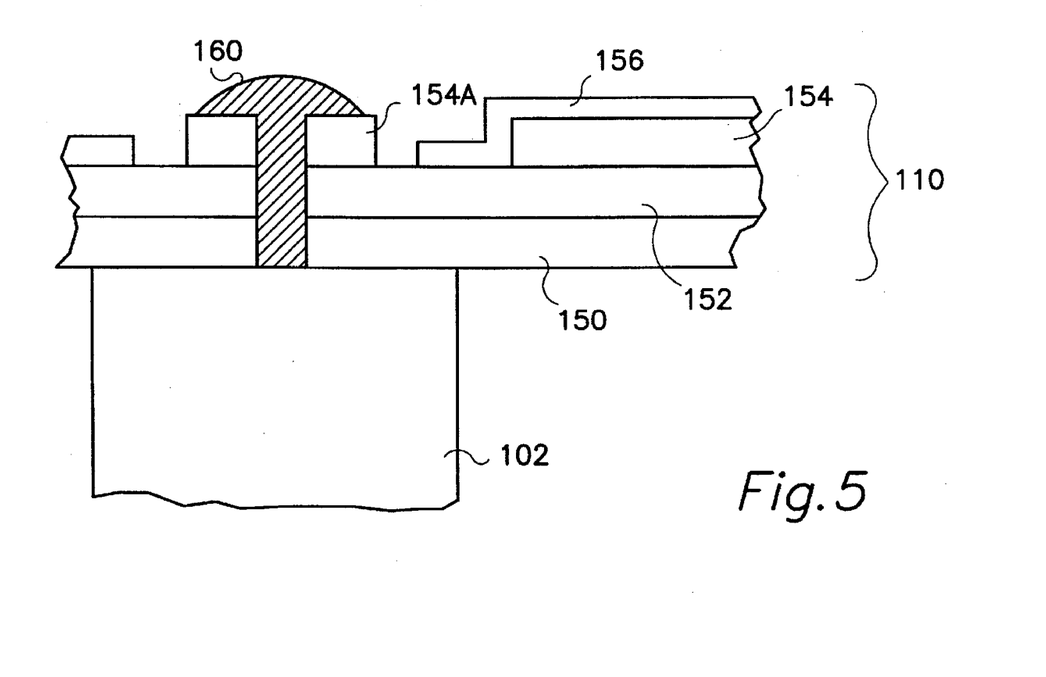
FIG. 5 is a sectional view of a flexible substrate and a magnet showing the attachment of the two elements together by the use of solder.

FIG. 5 shows a highly schematic sectional view of the flexible substrate 110 with its copper layer 150, its polyimide base laminate 152, its etched copper layer 154 and its polyimide cover layer 156. A specific portion of the etched copper layer 154 is identified by reference numeral 154A in FIG. 5. It represents a generally circular etched conductive pad through which a hole extends downward through the entire thickness of the flexible substrate 110. The hole, which is similar to hole 130 in FIG. 4, is used to attach the flexible substrate 110 to the magnet 102. By melting solder 160 while the permanent magnet 102 is in firm contact with the copper layer 150, the solder 160 will melt and flow through the thickness of the flexible substrate 110 to bond to the upper surface of the permanent magnet 102. The spots on the upper surface of the permanent magnet 102 where the solder bonds to the magnet 102 are identified by reference numerals 130A and 132A in FIG. 4. These two spots provide a rigid attachment of the flexible substrate 110 to the permanent magnet 102 and holds the magnetically sensitive component 100 in its proper position relative to the permanent magnet 102 during the assembly process in the mold and during the subsequent injection of a thermoset material that is used as an encapsulant.

Figure 6:
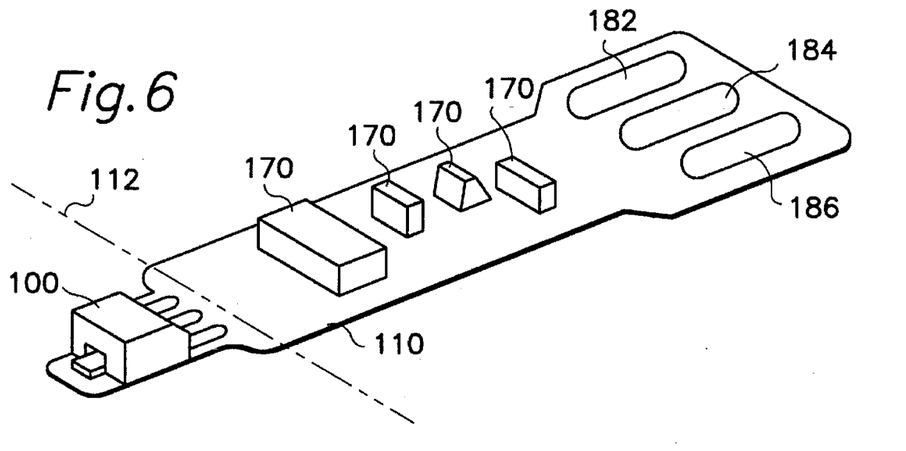
FIG. 6 shows a flexible substrate, several electronic components and a magnetically sensitive component attached to the substrate.
Figure 7:
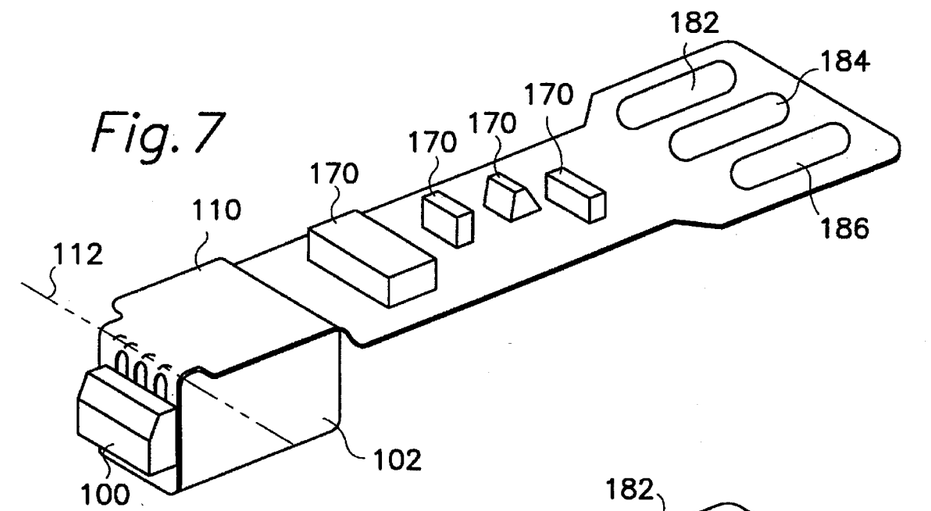
FIG. 7 shows the assembly of FIG. 6 with the flexible substrate being folded along a bend line to accommodate a permanent magnet attached to the flexible substrate.
Figure 8:
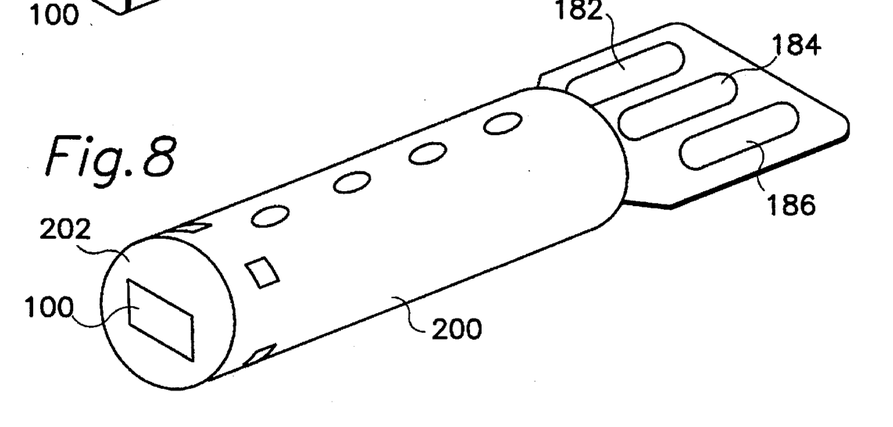
FIG. 8 shows a magnetic sensor that is provided by encapsulating the assembly shown in FIG. 7 with a thermoset material.

FIGS. 6, 7 and 8 show the progressive stages of manufacture of a magnetic sensor made in accordance with the present invention. In FIG. 6, the flexible substrate 110 is provided and the magnetically sensitive component 100 is attached to its upper surface through the use of leads that extend from the magnetically sensitive component 100. Other electronic components, such as capacitors, resistors and other components used in association with the circuit of the magnetic sensor are also attached to the upper surface of the flexible substrate 110. These components are identified by reference numeral 170 in FIG. 6. The specific size and type of electronic component 170 are not critical or limiting to the present invention. Although not shown in FIGS. 6, 7 and 8, a plurality of electrically conductive runs are disposed on the upper surface of the flexible substrate 110 and the various electronic components 170 and the magnetically sensitive component 100 are connected in electrical communication with preselected ones of the plurality of electrically conductive runs. These conductive runs, although not shown in FIGS. 6 and 7, are very well known to those skilled in the art and can be shaped to provide appropriate interconnections between the magnetically sensitive device and other components. Contact pads, which are identified by reference numerals 182, 184 and 186 are provided to permit electrical connection of the magnetic sensor to external components. The contact pads are each connected in electrical communication with preselected ones of the electrically conductive runs and, in typical applications, are extensions of preselected ones of those electrically conductive runs. Bend line 112 in FIG. 6 shows where the flat flexible substrate 110 can be bent to achieve the advantages of the present invention.

FIG. 7 shows the flexible conduit 110 bent at line 112 to place the magnetically sensitive component 100 on the face of permanent magnet 102 while leaving the electronic components 170 at the side and behind the permanent magnet 102. The holes, identified by reference numerals 130 and 132 in FIG. 4, are not specifically shown in FIGS. 6 and 7. However, it should be understood that the holes can easily be provided through the flexible substrate. In addition, alternative soldering techniques can be used, such as placing solder directly on the pole face of the permanent magnet 102 and reflowing the solder when the magnetically sensitive component 100 is placed in its proper position during calibration.

When the components are disposed in their location shown in FIG. 7, the entire structure can be placed in a mold cavity and can be injection molded with a molten thermoset material, such as that which is identified as stock number MG33F-0588 by the Hysol Company. The use of thermoset material reduces the forces imposed on the components during the injection molding process.

FIG. 8 shows a completed magnetic sensor with a solidified thermoset material 200 formed in the shape of a solid cylinder. The upper surface of the magnetically sensitive component 100 is exposed through the face 202 of the magnetic sensor. The various holes shown in the cylindrical outer surface of the sensor represent pin holes that are used during the encapsulation process. An exposed portion of the flexible substrate is shown extending from the opposite end of the sensor with the contact pads 182, 184 and 186 exposed for subsequent connection to external components.

Figure 9A:
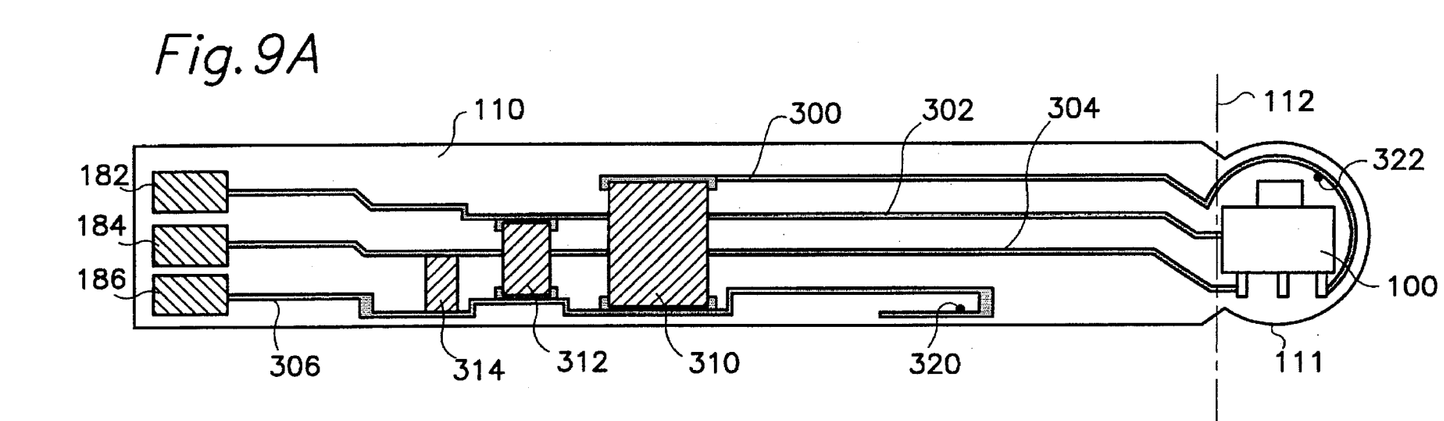
FIGS. 9A, 9B and 9C show three views of one embodiment of the present invention in which a magnetically sensitive component is attached to an end portion of a flexible substrate and the flexible substrate is attached directly to a permanent magnet.

FIG. 9A is an alternative representation of the arrangement shown in FIG. 6. The flexible substrate 110 has a generally circular end portion on which the magnetically sensitive component 100 is attached. Conductive runs 300, 302 and 304, extend between the contact pads 182, 184 and 186 and conductive leads that extend from the package containing the magnetically sensitive component. Also shown in FIG. 9A are three capacitors 310, 312 and 314. The bend line 112 is also shown in FIG. 9A to illustrate where the flexible substrate 110 would be folded to accommodate the purposes of the present invention. Although not shown in the view of FIG. 9A, it should be understood that the opposite surface of the flexible substrate 110, which is the underside of the substrate in FIG. 9A, is predominately covered by an electrically conductive ground plane surface such as that which is identified by reference numeral 150 in FIG. 5. That ground plane, which is typically made of copper, provides a ground connection for those components and conductive runs on the opposite surface of the flexible substrate which require a connection to a point of ground potential. In FIG. 9A, a hole 320 connects conductive run 306 to the ground plane on the opposite surface of the flexible substrate. This allows the device to be connected to an external ground through contact pad 186. In addition, another hole 322 is provided at the end of the flexible substrate 110 near the magnetically sensitive component 100. The primary purpose of these holes is to allow components on one surface of the flexible substrate to be connected electrically to components or conductive runs on the opposite surface of the flexible substrate by connecting the opposite surfaces of the substrate together with an electrically conductive material such as solder. The hole 322 at the end of the flexible substrate 110 is used by the present invention to perform the additional function of attaching the flexible substrate 110 to the permanent magnet as described above.

Figure 9B:
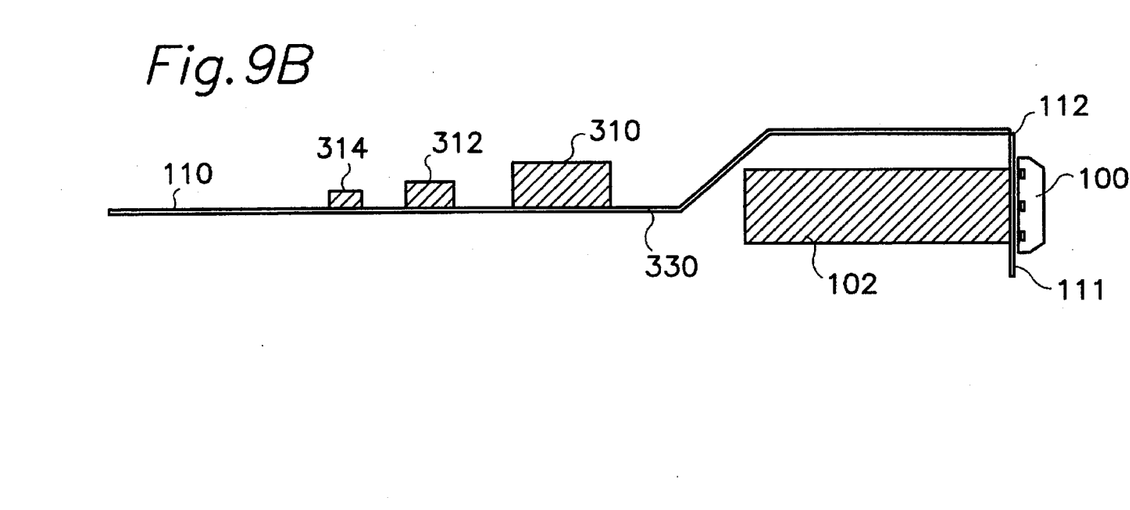

FIG. 9B shows a side view of the device in FIG. 9A. The undersurface 330 of the flexible substrate 110 is generally covered by the ground plane provided by a layer of copper such as that which is identified by reference numeral 150 in FIG. 5. The capacitors, 310, 312 and 314, are shown in FIG. 9B to provide a perspective between FIGS. 9A and 9B. The flexible substrate 110 is bent at line 112 to place the magnetically sensitive component 100 over a pole face of the permanent magnet 102. The permanent magnet 102 can be shaped to have a square cross section, a rectangular cross section or a circular cross section. These alternative selections are not limiting to the present invention. Although the flexible substrate 110 is shown in noncontact association with the side of the magnet 102 in the region between bend line 112 and capacitor 310, it should be understood that a preferred embodiment of the present invention would place the flexible substrate in contact with the side of the magnet in order to reduce the total thickness of the combination and permit it to be contained within a quantity of thermoset material that has a reduced thickness.

Figure 9C:
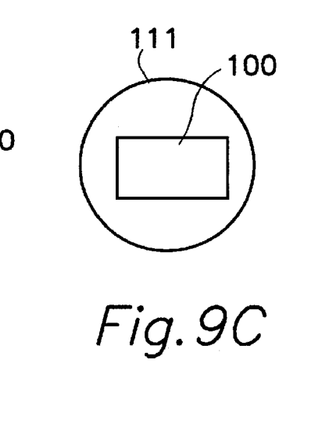

FIG. 9C is an end view of the representation shown in FIG. 9B. The magnetically sensitive component 100 is generally centered with respect to the circular portion 111 of the flexible substrate 110. By bending the flexible substrate 110 at bend line 112, the overall cross section of the device is reduced to that shown in FIG. 9C.

In the various alternative embodiments of the present invention, the permanent magnet 102 can be of several cross sectional shapes. In addition, although a preferred embodiment of the present invention places the magnetically sensitive component 100 at an end of the flexible substrate 110, alternative embodiments could place the magnetically sensitive component 100 proximate the central region of the flexible substrate 110. Furthermore, although various types of permanent magnet 102 can be used in conjunction with the present invention, a preferred embodiment of the present invention incorporates a permanent magnet that is coated with nickel in order to facilitate the attachment of the ground plane on the underside of the flexible substrate 110 to the magnet. The magnetically sensitive component 100 can be a hall effect element or a magnetoresistive element. If it is a magnetoresistive element, the attachment of the ground plane to the magnet prior to the overmolding process is much more important than if the magnetically sensitive component 100 is a Hall effect element. However, the attachment of the flexible circuit 110 to the permanent magnet 102 serves other purposes and facilitates the positioning of the components within a mold prior to and during the overmolding process.

The present invention provides several significant advantages with respect to known magnetic sensors. For example, the present invention removes the need for a carrier to contain the magnet and position the magnet relative to the magnetically sensitive component. In addition, the present invention enables the use of a flexible substrate instead of a rigid circuit board. A flexible substrate, in turn, permits the electronic components to be placed at the side of the magnet while the magnetically sensitive component is disposed proximate the pole face of the permanent magnet. This, in conjunction with the removal of the carrier, reduces the overall size of the magnetic sensor. The use of the flexible substrate is made possible through the application of an encapsulation procedure that utilizes a thermoset material instead of a thermoplastic material. Heretofore, thermoplastic materials have been used for these purposes. Since thermoplastic overmolding requires the injection of the material at high pressures and temperatures, damage would occur if an attempt was made to use a flexible substrate in conjunction with the thermoplastic material. By using thermoset material, the forces are significantly reduced and a flexible substrate can be used. All of these advantages combine to reduce the expense of the magnetic sensor and to significantly minimize its size.

The embodiments of the invention in which an exclusive property or right is claimed are defined as follows:

1. A magnetic sensor, comprising:

a flexible substrate having a plurality of electrically conductive runs attached thereto;

a magnetically sensitive component attached to said flexible substrate, said magnetically sensitive component being connected in electrical communication with at least one of said plurality of electrically conductive runs;

a permanent magnet attached in a fixed position relative to said magnetically sensitive component, said magnetically sensitive component being disposed within the magnetic field of said permanent magnet proximate a magnetic pole of said permanent magnet, said flexible substrate being rigidly attached to said permanent magnet independently of the encapsulation provided by said quantity of solidified thermoset material and at a location, relative to said permanent magnet, determined by an active calibration procedure by which said flexible substrate is moved relative to said permanent magnet until said magnetically sensitive component provides a predetermined output signal, said permanent magnet being plated with a material to facilitate said flexible substrate being rigidly attached to said permanent magnet by solder;

a quantity of solidified thermoset material disposed around said permanent magnet, said magnetically sensitive component and a first portion of said plurality of electrically conductive runs, a second portion of said plurality of electrically conductive runs extending from said quantity of solidified thermoset material, said permanent magnet and said magnetically sensitive component being encapsulated within said quantity of solidified thermoset material; and a hole through said flexible substrate, said solder extending through said hole to a surface of said permanent magnet from a surface of said flexible substrate which is facing away from said permanent magnet.

2. The sensor of claim 1, wherein:

said magnetically sensitive component comprises at least one magnetoresistive element.

3. The sensor of claim 1, wherein:

said magnetically sensitive component comprises a Hall effect element.

4. The sensor of claim 1, wherein:

said permanent magnet comprises neodymium, boron and iron.

5. The sensor of claim 1, wherein:

a plurality of electronic components is connected in electrical communication with preselected ones of said plurality of electrically conductive runs.

* * * * *